3,227,379
CIRCUIT TORCH

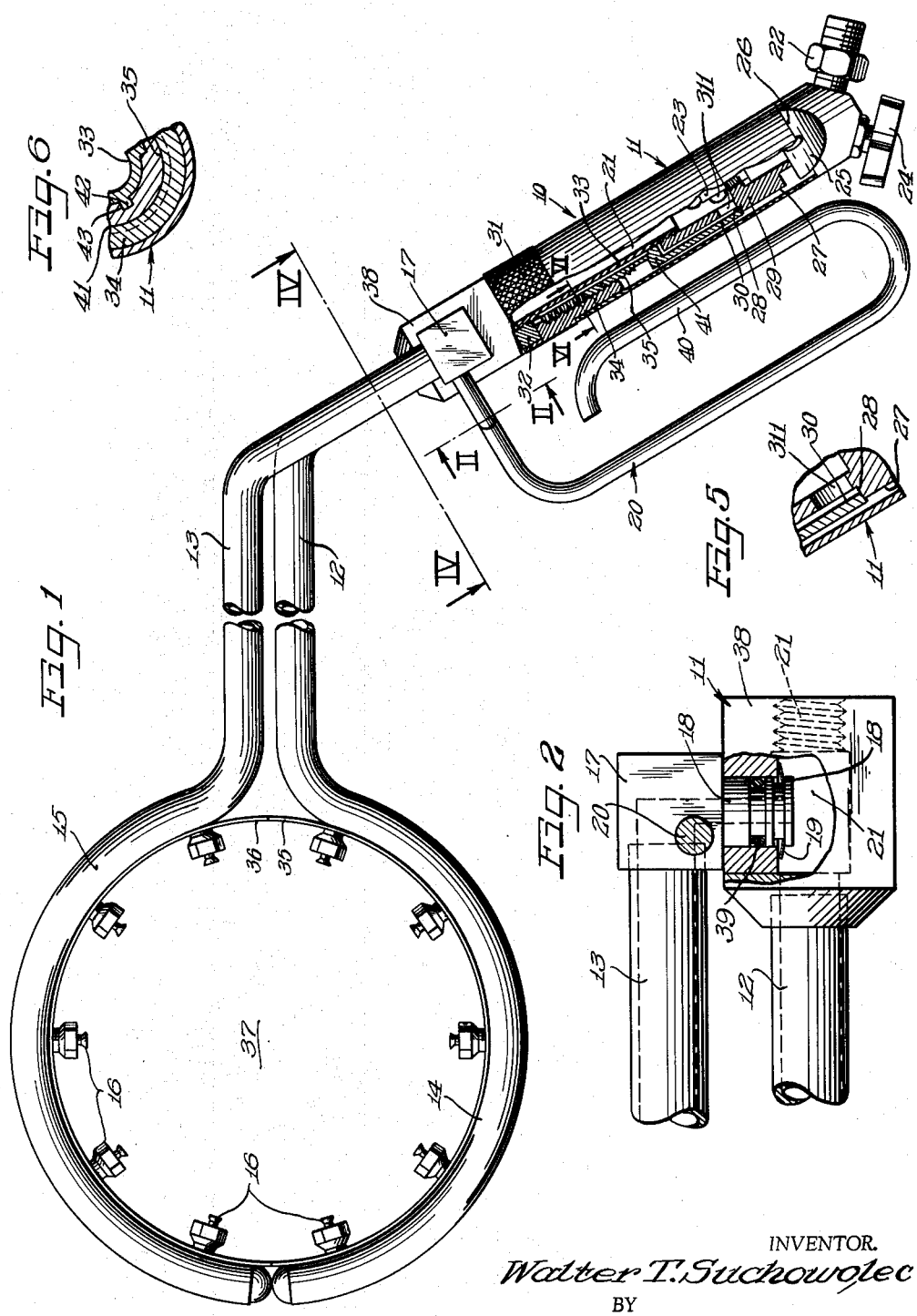

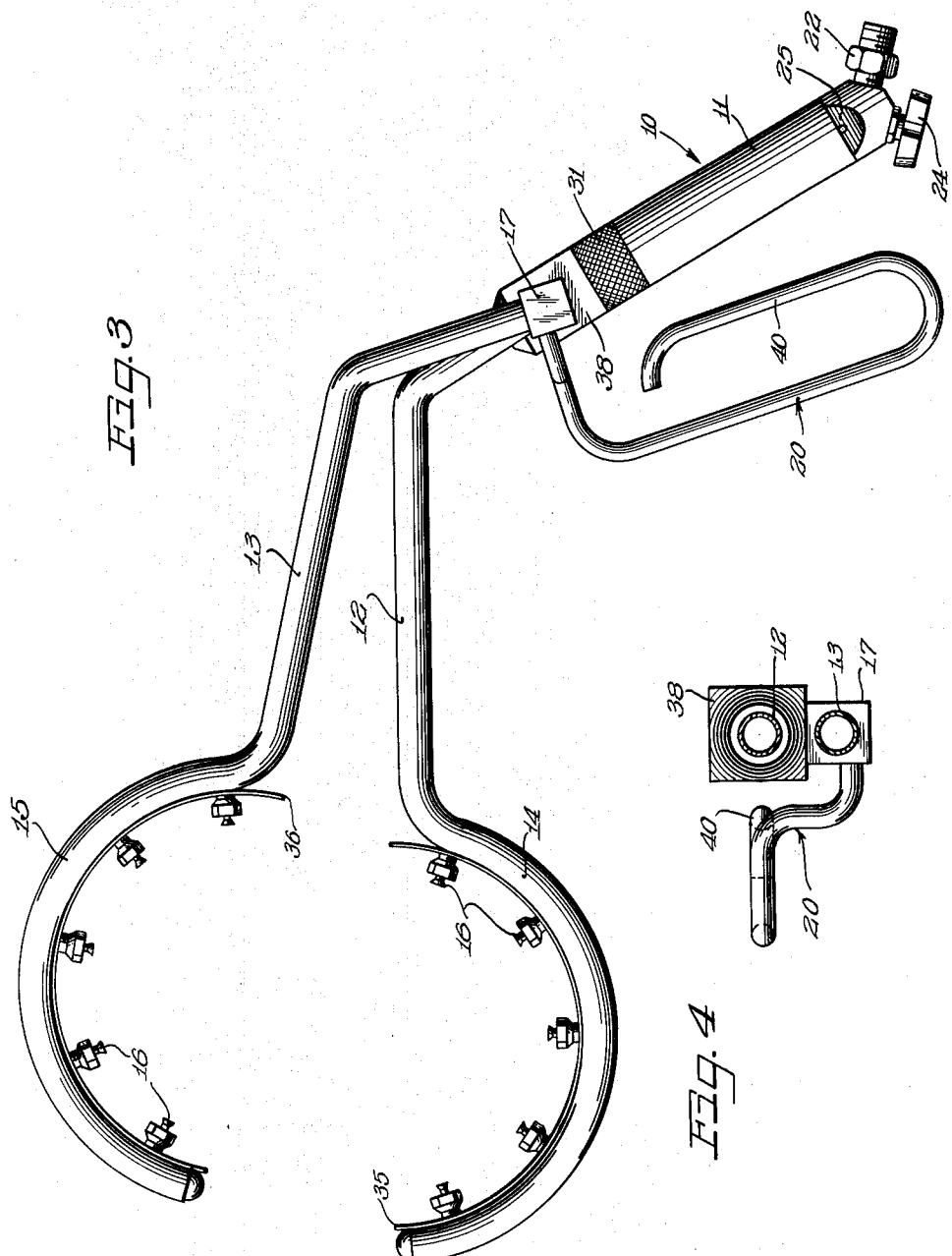

Walter T. Suchowolec, Sycamore, Ill., assignor to Turner Corporation, Sycamore, Ill., a corporation of Illinois
Filed Mar. 26, 1963, Ser. No. 268,128
10 Claims. (Cl. 239—413)

This invention relates to gas torches, and more particularly relates to a gas torch of a type having a plurality of burner jets which can be focused around the periphery of a workpiece.

Gas torches have heretofore been provided for heating the periphery of an object, but have been difficult to hold and operate and have not been entirely satisfactory for continued and repeated use due to the difficulty in holding the torch and placing it about an object being heated, and adjusting the air and gas valves while holding the torch.

It is, therefore, an object of this invention to provide a novel and improved form of peripheral or circuit gas torch in which the air adjustment valve of the torch is so arranged as to be easily adjusted with the same hand that holds the torch.

It is a further object of this invention to provide a gas torch having a plurality of burner jets capable of being focused around the periphery of a workpiece by a simple movement of the operator's hand.

It is a further object of this invention to provide an improved form of gas torch of the scissors type in which a plurality of burner jets extend from the blades of the scissors and close by gravity with little or no effort on the part of the operator.

It is a further object of the invention to provide a gas torch having an improved arrangement of burner jets arranged in the general form of an openable annulus and directed radially towards the center thereof, in which the opening and closing of the annulus and mixture of the gas with air may be controlled by the hand holding the torch.

Other objects and advantages of this invention will become apparent from the following disclosure, taken in conjunction with the accompanying drawings in which:

FIGURE 1 is a plan view of one form of torch constructed in accordance with the principles of the present instant invention, showing the torch in a closed position, with certain parts broken away and certain other parts shown in section in order to illustrate certain adjusting means for the air valve;

FIGURE 2 is a detail view, partly in section, taken along the line II—II of FIGURE 1, showing the pivotal connection of the movable blade to the handle of the torch;

FIGURE 3 is a plan view of the torch showing the torch in a slightly open position;

FIGURE 4 is a fragmentary sectional view taken along line IV—IV of FIGURE 1, showing the handle for the movable blade of the torch and its relationship to the torch handle;

FIGURE 5 is an enlarged fragmentary sectional view of a portion of the air adjustment valve of FIGURE 1, showing the cooperation of the air valve with its seat; and FIGURE 6 is a fragmentary sectional view taken along the line VI—VI of FIGURE 1, showing certain details of the air valve not shown in FIGURES 1 and 5.

Referring now to the drawings, FIGURES 1 and 3 show a gas torch 10 commonly called a circuit torch having a handle 11 with a scissors arrangement of gas jet assembly extending therefrom including a stationary tube assembly 12, and a movable tube assembly 13. The stationary tube assembly 12 and the movable tube assembly 13 have outer end portions 14 and 15 respectively generally semi-circular in form to form an annulus having an open portion 37 through which pipe and the like may extend when the assembly is in a closed position. Each end portion 14 and 15 has series of equally spaced gas burners 16 on their inner peripheral surfaces and extending inwardly therefrom. While the end portions 14 and 15 are shown as being of substantially semi-circular in form they need not be so formed and may be formed to define a square, ellipse, triangle, or any other shape, to direct the burners 16 evenly around the periphery of a workpiece.

The burners 16 are shown as extending radially inwardly from the end portions 14 and 15 and are backed up by the heat shields 35 and 36, mounted on the insides of the respective end portions 14 and 15. The heat shields 35 and 36 may be made from sheet metal, or the like and may have highly polished or heat reflective surfaces, on the sides thereof facing the center of the open portion 37.

In FIGURE 3 the semi-circular end portions 14 and 15 are shown as being separated, so as to be conveniently placed over a workpiece, the periphery of which it is desired to evenly heat. This separation of the end portions 14 and 15 is attained by mounting the movable tube assembly 13 in scissors relationship with the stationary tube assembly 12. The movable tube assembly 13 is mounted on and extends from a pivot block 17 having a nipple 18 extending therefrom at right angles to the tube 13. The nipple 18 extends within and is rotatably mounted in a block member 38 on the end of the handle 11. A spring washer 19 on the inner end of the nipple 18 secures the nipple 18 to the block member 38. A seal in the form of an O-ring 39 is mounted on the nipple 18 to prevent leakage of gas to the atmosphere between the nipple 18 and the block member 38. The pivot block 17 has a handle 20 secured thereto and extending therefrom at right angles to the tube 13. The handle 20 has an inturned portion extending parallel to handle 11, when the semi-circular end portions 14 and 15 are together, as viewed in FIGURE 1. The handle 20 also has an inwardly and backwardly turned finger grip 40 (see FIGURES 1, 3 and 4) the fingers of which the operator may conveniently grasp to open the torch 10. The finger grip 40 is relatively close to the handle 11 so the operator may use the fingers of the hand that holds the torch handle 11, to grasp the finger grip 40. The thumb or index finger of the same hand may also turn a knurled sleeve 31 to control the mixture of air with the gas. The handle 20 and the handle 11 are thus the handles of a scissors, with the stationary tube assembly 12 and movable tube assembly 13 and the semi-circular end portions 14 and 15 thereof, being the blades of the scissors.

It will be seen from FIGURES 3 and 4 that the handle 20 and finger grip 40 are so located with respect to the movable tube assembly 13 that when the semi-circular end portions 14 and 15 are placed about a pipe, the end portion 15 will tend to move to a closed position by gravity as the fingers are released from the finger grip 40.

The nipple 18 besides forming a pivot pin for the movable assembly 13 has communication with a chamber 21 in the block member 38 and provides a passageway from the chamber 21 to the movable tube assembly 13.

Similarly, the stationary tube assembly 12 is connected to and has communication with the block member 38 which provides a passageway between the chamber 21 the stationary tube assembly 12.

Notice in FIGURE 1 that the chamber 21 extends lengthwise of the handle 11 and is partially formed by the inner periphery of a sleeve 33 threaded in the block 38 coaxially of the tube assembly 12. High pressure gas enters the mixing chamber 21 through a nozzle 23 which has communication with an inlet fitting 22. The volume of gas entering the chamber 21 through the nozzle 23 is controlled by a knob 24 operating a suitable gas valve (not shown).

Air is admitted to the handle 11 through a depressed portion 25 of the handle 11 having an inlet passageway 26 having communication with a stepped annular passageway 27 extending along the interior of the handle 11 along the outside of a cylindrically shaped plug 29 located at the end of the chamber 21. The plug 29 has an upwardly facing annular recess 28 which serves as a seat for an annular air valve 30 on the end of a rectilinear movable sleeve 41.

The knurled sleeve 31 is rotatably mounted on a plug 32 extending inwardly from the block 38 and threaded on the sleeve 33 and retained from movement with respect to the block 38. The knurled sleeve 31 has a reduced diameter portion extending along the inside of a casing part of the handle 11 and is internally threaded as indicated by reference character 34. The threads of the sleeve 31 are threaded on an externally threaded portion 35 of the sleeve 41. The sleeve 33 extends along the inside of the sleeve 41 and is splined thereto, as indicated by reference character 42.

Turning of the sleeve 31 by the fingers in one direction or another, thus moves the annular valve 30 relatively to the seat 28 to vary the quantity of air entering air inlet orifices 311 leading to the hollow interior of the sleeve 33, to mix with gas entering the hollow interior of said sleeve through the nozzle 23 under the control of the valve located in the flow passageway at the inlet end of the handle and operated by the knob 24.

Operation of the gas circuit torch 10 is as follows:

A pressurized tank or container of a fuel such as liquefied petroleum or propane is connected to the inlet fitting 22 either directly, if a manually sized bottle, or by means of a hose if a larger tank is employed. The knob 24 and the knurled sleeve 31 are manually turned until the proper mixture of air and gas is attained. The expansion of the gas through the nozzle 23 generates an aspirating effect and draws air into the chamber 21 under the control of the valve 30 to mix with the gas and form a highly combustible fuel supplied to the burners 16 through the tube assemblies 12 and 13 and the semi-circular end portions thereof.

It should be appreciated that the gas torch of the instant invention can be used in very cramped conditions such as, for example, where pipes are located near obstructions which prevent manipulation of a conventional torch around the circumference of the joint, or the like.

It may further be seen that with the torch herein disclosed an improved scissors action is afforded which does not require an operator to squeeze against a spring bias. Rather, the hand fits readily on the handle 11 and the fingers conveniently grasp the finger grip 40 so that opening and closing of the torch and adjustment of the air valve may readily be effected and the normal grasping and supporting of the device will keep the torch in closed operative relationship to the work area.

It will be understood that modifications and variations may be effected without departing from the scope of the novel concepts of the present invention.

I claim as my invention:

1. In a gas torch, a handle having a mixing chamber for air and gas therein, a first tube extending from said handle and having communication with said mixing chamber, a second tube transversely pivoted to said handle and having communication with said mixing chamber, said first and second tubes having outer end portions generally semi-circular in form and being closed at their outer ends, a plurality of radially inwardly extending gas burntions of said tubes, a finger grip connected with said ers on the inner surfaces of the semi-circular formed porpivoted tube and normally lying along said handle when said tubes are in operative association with an article to be heated, and means including a sleeve rotatably mounted on said handle in convenient relation with respect to said finger grip for varying the mixture of gas and air in said mixing chamber.

2. A gas torch comprising a handle having a mixing chamber therein, air and gas inlets leading into said handle and mixing chamber adjacent one end thereof, first and second gas tubes leading from theopposite end of said handle from said inlet and having communication with siad mixing hcamber, one of said gas tubes being trannversely pivoted to said handle, said gas tube having outer end portions forming a separable annulus, gas burners extending inwardly of said tubes and directed toward the center of said annulus when said tubes are in a closed position, the portions of said tubes forming said annulus adapted to extend vertically during operation of the torch, the pivoted tube being above the stationary tube and biased to close said annulus by the overhanging weight of said tube, and a sleeve rotatably mounted on said handle and adapted to be operated by the hand holding said handle to vary the mixture of air with gas entering said mixing chamber.

3. A gas torch comprising a handle having a mixing chamber therein, air and gas inlets leading into said handle and mixing chamber adjacent one end thereof, first and second gas tubes leading from the opposite end of said handle from said inlet and having communication with said mixing chamber, one of said gas tubes being transversely pivoted to said handle, said gas tubes having outer end portions forming a separable annulus, gas burners extending inwardly of said tubes and directed toward the center of said annulus when said tubes are in a closed position, the portions of said tubes forming said annulus adapted to extend vertically during operation of the torch, the pivoted tube being above the stationary tube and biased to close said annulus by the overhanging weight of said tube, a finger grip extending from said pivoted tube along said handle and operable to separate said tubes by the fingers of the hand gripping said handle and a sleeve rotatably mounted on said handle at the end thereof adjacent said tubes and adapted to be operated by a finger of the hand holding said handle to vary the mixture of air with gas entering said mixing chamber.

4. In a circuit gas torch, a handle having a mixing chamber therein, separate air and gas inlets leading into said handle and mixing chamber at one end thereof, stationary and pivoted gas tubes having closed ends having communication with said mixing chamber and leading from the opposite end of said handle from said inlets and having cooperating end portions forming an annulus when said closed ends are in engagement with each other and having gas burners spaced therealong and directed toward the center of said annulus, a valve seat at the end of said mixing chamber adjacent said air inlet, a valve engageable with said seat and movable along said handle toward and from said seat to vary the quantity of air entering said mixing chamber, and means connected with said valve and adapted to be operated by the hand gripping said handle comprising a sleeve rotatably mounted on said handle and having a valve operating means within said handle for moving said valve toward open and closed positions upon rotatable movement of said sleeve.

5. In a circuit gas torch, a handle having a mixing chamber therein, separate air and gas inlets leading into said handle and mixing chamber at one end thereof, stationary and pivoted gas tubes having closed ends having communication with said mixing chamber and leading from the opposite end of said handle from said inlets and having cooperating end portions forming an annulus when said closed ends are in engagement with each other and having gas burners spaced therealong and directed toward the center of said annulus, an annular air chamber within said handle on the outside of said mixing chamber, an annular valve seat between said air chamber and said mixing chamber, an annular valve engageable with said seat and controlling the passage of air to said mixing chamber, means holding said valve from rotation, and means adapted to be operated from the outside of said handle by the hand holding said handle comprising a sleeve rotatably mounted on said handle and having a threaded portion extending within said handle having threaded engagement with said valve for moving said valve into open and closed positions upon rotatable movement of said sleeve.

6. In a circuit gas torch, a handle having a mixing chamber therein, separate air and gas inlets leading into said handle and mixing chamber at one end thereof, stationary and pivoted gas tubes having closed ends having communication with said mixing chamber and leading from the opposite end of said handle from said inlets and having cooperating end portions forming an annulus when said closed ends are in engagement with each other and having gas burners spaced therealong and directed toward the center of said annulus, an annular air chamber within said handle on the outside of said mixing chamber, an annular valve seat between said air chamber and said mixing chamber, an annular valve engageable with said seat and controlling the passage of air to said mixing chamber, means holding said valve from rotation, valve operating means adapted to be operated by the hand holding said handle comprising a sleeve rotatably mounted on said handle and having a threaded portion within said handle having threaded engagement with said valve, and other means accessible from said handle for pivotally moving the pivoted gas tube with respect to the stationary tube to open and close the annulus formed by the end portions of said tubes comprising a finger lever connected to and extending from said pivoted tube and lying along said handle when the ends of said tubes are in abutting engagement with each other.

7. In a gas torch,
an elongated handle having a chamber for receiving air and gas therein,
a block member fixedly mounted on the handle at one end thereof and having a chamber formed therein in communication with said receiving chamber,
a first tube assembly fixedly connected to said block member in communication with said receiving chamber and terminating at one end thereof in a first arcuately shaped portion lying in a given plane,
a second tube assembly terminating at one end thereof in a second arcuate portion shaped complementarily to said first arcuate portion,
means for mounting said second tube assembly on said block member for pivotal movement thereof so that said second arcuate portion moves only in said given plane to form with said first arcuate portion a planar annulus and including,
  a nipple interconnecting said second tube assembly at the opposite end thereof and said block member and mounted on said block member for rotation only about the axis thereof,
  said nipple being provided with a passageway communicating said chamber and said second tube assembly, means projecting the gas-air mixture radially inwardly of the arcuately shaped portions, and
a finger grip member connected to said nipple and extending therefrom in juxtaposition to said handle for pivoting said second arcuate portion about said nipple to open and close the annulus.

8. In a gas torch,
an elongated handle having a mixing chamber for air and gas therein,
a block member fixedly mounted on the handle at one end thereof and having a chamber formed therein in communication with said mixing chamber,
a first tube assembly fixedly connected to said block member and in communication with said chamber and terminating at one end thereof in a first arcuately shaped portion,
means forming a cylindrical bore in said block member extending from said chamber out one side of said block member,
a nipple rotatably received in said bore and extending out said one side of said block member to form a pivot block,
a second tube assembly fixedly connected to said pivot block and terminating at one end thereof in a second arcuately shaped portion forming an annulus with said first arcuately shaped portion,
means projecting the gas-air mixture radially inwardly of the arcuately shaped portions,
passageway means in said nipple communicating said chamber and said second tube assembly, and
a finger grip member connected to said pivot block and extending in juxtaposition to said handle for pivoting said second tube assembly about said pivot block to open the annulus formed by said arcuate portions.

9. The gas torch as defined in claim 8, and including, sealing means in said bore and around said nipple to ensure a leak-proof relationship therebetween.

10. The gas torch as defined in claim 8, and including, securing means within said chamber of said block member to retain said nipple in said bore.

References Cited by the Examiner

UNITED STATES PATENTS

| | | | |
|---|---|---|---|
| 1,316,190 | 9/1919 | Sackerman | 150—107 X |
| 2,001,538 | 5/1935 | Mueller et al. | 219—225 X |
| 2,436,617 | 2/1948 | Svet | 158—27.4 |
| 2,593,295 | 4/1952 | Granfield | 158—99 |
| 3,088,515 | 5/1963 | Fagan | 158—107 |

FOREIGN PATENTS

| | | |
|---|---|---|
| 504,733 | 8/1930 | Germany. |

FREDERICK L. MATTESON, JR., *Primary Examiner.*

MEYER PERLIN, *Examiner.*